US010984479B1

(12) United States Patent
Kyne et al.

(10) Patent No.: US 10,984,479 B1
(45) Date of Patent: Apr. 20, 2021

(54) SYSTEM AND METHOD FOR TRACKING THE OPERATION OF A VEHICLE AND/OR THE ACTIONS OF A DRIVER (71) Applicant: UIPCO, LLC, San Antonio, TX (US)

(72) Inventors: Michael Kyne, San Antonio, TX (US); Joel T. Camarano, San Antonio, TX (US); Bharat Prasad, San Antonio, TX (US); Charles Lee Oakes, III, Boerne, TX (US); Gunjan C. Vijayvergia, San Antonio, TX (US); Christine Marie Brown, Helotes, TX (US); Rod Gonzales, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 611 days.

(21) Appl. No.: 15/296,850

(22) Filed: Oct. 18, 2016

Related U.S. Application Data (60) Provisional application No. 62/243,999, filed on Oct. 20, 2015.

(51) Int. Cl.
G06Q 40/00 (2012.01)
G06Q 40/08 (2012.01)
(Continued)

(52) U.S. Cl.
CPC ............ G06Q 40/08 (2013.01); G07C 5/008 (2013.01); H04L 67/12 (2013.01)

(58) Field of Classification Search
CPC ......... G06Q 40/08; G07C 5/008; H04L 67/12
See application file for complete search history.

(56) References Cited

U.S. PATENT DOCUMENTS 7,133,767 B2 * 11/2006 Ogino .................... G01C 21/26
701/400
8,140,358 B1 * 3/2012 Ling ...................... G06Q 40/08
705/4
(Continued)

FOREIGN PATENT DOCUMENTS

JP      2014219366 A   * 11/2014

OTHER PUBLICATIONS

Chakravarty et al: "MobiDriveScore—A System for Mobile Sensor Based Driving Analysis—A Risk Assessment Model for Improving One's Driving", Tata Consultancy Services, Kolkata, India, 2013 Seventh International Conference on Sensing Technology (Year: 2013).*

(Continued)

Primary Examiner — Edward J Baird
(74) Attorney, Agent, or Firm — Fletcher Voder, P.C.

(57) ABSTRACT

A system includes a monitoring device coupled to a vehicle. The monitoring device includes a communication interface and one or more processors coupled to the communication interface. The one or more processors receive, via the communication interface, sensor information relating to operating the vehicle. The one or more processors also receive, via the communication interface, contextual information based at least in part on the sensor information relating to operating the vehicle. The one or more processors further generate a risk factor relating to operating the vehicle based at least in part on the sensor information and the contextual information.

20 Claims, 3 Drawing Sheets (51) Int. Cl.
    *G07C 5/00*     (2006.01)
    *H04L 29/08*    (2006.01)

(56) References Cited

U.S. PATENT DOCUMENTS

| | | | | |
|---|---|---|---|---|
| 9,390,452 | B1* | 7/2016 | Biemer | B60W 10/30 |
| 9,755,850 | B2* | 9/2017 | Stolfus | H04L 12/6418 |
| 10,008,111 | B1* | 6/2018 | Grant | G08G 1/166 |
| 10,210,761 | B2* | 2/2019 | Rau | G08G 1/167 |
| 10,217,169 | B2* | 2/2019 | Schumann, Jr. | G06Q 40/08 |
| 2002/0095249 | A1* | 7/2002 | Lang | G07C 5/008 |
| | | | | 701/31.4 |
| 2002/0111725 | A1* | 8/2002 | Burge | G06Q 40/08 |
| | | | | 701/31.4 |
| 2003/0182033 | A1* | 9/2003 | Underdahl | G07C 5/008 |
| | | | | 701/31.4 |
| 2004/0153362 | A1* | 8/2004 | Bauer | G06Q 40/08 |
| | | | | 705/4 |
| 2005/0131597 | A1* | 6/2005 | Raz | G09B 19/167 |
| | | | | 701/29.1 |
| 2006/0053038 | A1* | 3/2006 | Warren | G06Q 40/08 |
| | | | | 705/4 |
| 2007/0250229 | A1* | 10/2007 | Wu | G06Q 10/06 |
| | | | | 701/31.4 |
| 2008/0077312 | A1* | 3/2008 | Mrotek | G08G 1/04 |
| | | | | 701/117 |
| 2011/0213628 | A1* | 9/2011 | Peak | G06Q 40/08 |
| | | | | 705/4 |
| 2012/0256769 | A1 | 10/2012 | Satpathy | |
| 2013/0046632 | A1 | 2/2013 | Grigg et al. | |
| 2013/0096731 | A1 | 4/2013 | Tamari et al. | |
| 2014/0052479 | A1* | 2/2014 | Kawamura | G06Q 40/08 |
| | | | | 705/4 |
| 2014/0074402 | A1* | 3/2014 | Hassib | G01C 21/3461 |
| | | | | 701/533 |
| 2014/0136472 | A1 | 5/2014 | Fratjord | |
| 2015/0025917 | A1 | 1/2015 | Stempora | |
| 2015/0160653 | A1* | 6/2015 | Cheatham, III | B60W 30/0956 |
| | | | | 701/23 |
| 2015/0296117 | A1* | 10/2015 | Johnson | H04M 1/72505 |
| | | | | 348/148 |
| 2015/0324923 | A1* | 11/2015 | Christensen | G06Q 30/0266 |
| | | | | 705/4 |
| 2016/0125248 | A1 | 5/2016 | Lee | |
| 2016/0157067 | A1 | 6/2016 | Capota et al. | |

OTHER PUBLICATIONS

U.S. Appl. No. 12/060,467, filed Apr. 1, 2008, Arthur Quentin Smith.

U.S. Appl. No. 15/073,253, filed Mar. 17, 2016, Arthur Quentin Smith.

* cited by examiner

SYSTEM AND METHOD FOR TRACKING THE OPERATION OF A VEHICLE AND/OR THE ACTIONS OF A DRIVER

CROSS REFERENCE TO RELATED APPLICATION

This application is claims the benefit of U.S. Provisional Application No. 62/243,999 to Kyne et al. filed Oct. 20, 2015, and incorporates the entirety of the same by reference herein. This application is related to co-pending U.S. patent application Ser. Ser. No. 15/296,898, entitled "SYSTEM AND METHOD FOR INCENTIVIZING DRIVING CHARACTERISTICS BY MONITORING OPERATIONAL DATA AND PROVIDING FEEDBACK," filed Oct. 18, 2016 which claims the benefit of U.S. Provisional Application No. 62/243,951 to Kyne et al. filed Oct. 20, 2015, each of which is herein incorporated by reference in its entirety.

BACKGROUND

The present disclosure relates generally to vehicle and/or driver tracking, and more particularly to systems and methods for acquiring data related to driving activity that is useful to risk analysis, insurance premium determination/adjustment, and behavioral incentivization.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Determining automotive insurance premiums for a driver may be based at least in part on analyzing a risk of incident associated with the driver's operation of a vehicle. Traditionally, this is done by gathering historical data from driving records, questionnaires, interviews, and so forth. For example, an insurer may increase the driver's insurance premium if the driver has been known to drive at excessive speeds, which may increase the risk of the driver causing an incident for which the insurer will ultimately be at least partly financially responsible. However, behavior such as this is not always documented. Accordingly, tracking operation of the vehicle may be useful in accurate risk analysis and adjustment/determination of an insurance premium. Traditional systems may be utilized to monitor machine operation that is relevant to insurance, as illustrated by U.S. Pat. No. 8,140,358, which is herein incorporated by reference. However, it is now recognized that such traditional techniques can be inefficient (e.g., with respect to data transfer, network requirements and utilization) and ineffective or lacking with respect to encouraging desirable driving characteristics among other things.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates to tracking operation of a vehicle (e.g., automobile, truck, motorcycle, recreational vehicle, boat, airplane, snowmobile) and/or actions of a driver of the vehicle, particularly with respect to acquiring data relevant to risk analysis and adjusting and/or determining the insurance premium. References to adjusting and/or determining the driver's insurance premium are an example of incentivizing the driver to operate the vehicle in a safe manner. Other incentivizing techniques (e.g., not related to insurance premiums) are also contemplated and meant to be included in each embodiment, including reducing the driver's insurance deductibles, periodic reward payments, competitive and/or game scenarios (e.g., by enabling the driver to compete with other drivers and/or accomplish milestones related to vehicle safety), and the like. Sensor information related to the operation of the vehicle may be provided from sensors integral with systems of the vehicle, coupled with the vehicle, and/or disposed in or around the vehicle (e.g., a smart phone within the vehicle). Contextual information (i.e., information related to a context or a vehicle context of the sensor information) may also be acquired from sensors associated with (e.g., integral with or disposed in) the vehicle or from external data sources (e.g., other vehicles).

Contextual information relating to the actions of the driver may be useful in accurately analyzing risk and adjusting and/or determining an insurance premium. Weather-related conditions, such as wet roads, may be considered as an example of the contextual information, which can be captured by certain onboard sensors (e.g., mechanisms for detecting rain or water on the road) or by accessing weather data (e.g., via the Internet) based on an identified location of the vehicle. Aspects of the geographical location of the vehicle may also be considered as an example of the contextual information. For example, the contextual information may include a degree of safety, traffic congestion, or accident rates of the geographical location in which the vehicle is located. The geographical location may be determined by computer location techniques, such as geo-fencing. In particular, the contextual information may include that the geographical location is considered a high crime, traffic, or accident rate area. The contextual information may be provided or accessed based on the date, time, and/or location that the sensor information was acquired. Contextual information may also include information related to other vehicles in a proximity to the driver's vehicle. For example, information may be collected by a communication device of the driver's vehicle, wherein the information is indicative of a condition of another vehicle or another driver of another vehicle in close proximity or along a potential route of the driver's vehicle.

The sensor information and/or the contextual information may be analyzed such that a risk factor or other score may be generated, which may occur completely onboard the vehicle in accordance with one embodiment. For example, knowledge of wet road conditions on which the driver operated the vehicle at an excessive speed may serve to increase a risk factor of the actions of the driver. An insurer or an analysis algorithm may accordingly increase the insurance premium because of the increased risk factor. On the other hand, in another example, the contextual information may determine that traffic was generally moving at speeds in excess of the speed limit, which may indicate that it was actually safer to move with traffic than at the speed limit. The contextual information received from the vehicles may indicate that another vehicle or driver of another vehicle in a proximity to the driver's vehicle is in poor condition (e.g., tires of the vehicle should be replaced, the driver of another vehicle appears impaired, and the like), increasing the risk factor of continuing operation in the proximity to the other vehicle or driver. In some embodiments, crowdsourcing or social media may provide the contextual information. For example, various apps and social media platforms operating on electronic communication devices (e.g., smartphones and the like) of other drivers separately (e.g., remotely located) from the vehicle and the driver enable communicating conditions related to vehicle operation, such as traffic incidents, traffic conditions, weather, etc., to the driver. The contextual information (e.g., presence of icy roads) provided by crowdsourcing and/or social media may be used to inform the driver of conditions related to vehicle operation (e.g., a presence of ice on a road) and/or analyze the risk of relevant vehicle operation. As another example, an insurer of the driver may gather the contextual information via electronic communication devices (e.g., smartphones, insurance-related communication devices, and the like) of other insured drivers, and provide the contextual information to the driver. Thus, this contextual information may prevent an improper increase in a driver's risk factor (which may be all or a component of an overall score for premium calculation purposes).

Additionally, present embodiments may provide feedback to the driver (e.g., in real-time) in response to the sensor information and/or contextual information, which may encourage the driver to operate the vehicle within desirable parameters. For example, in one embodiment, the driver is notified each time the driver's vehicle operation results in adjusting the driver's insurance premium. Accordingly, the driver may be encouraged to minimize behaviors that result in an increase in the insurance premium and maximize behaviors that result in a decrease in the insurance premium. Supply of such data in real-time (e.g., within a matter of seconds from measurement) may facilitate a game-type display of data that encourages drivers to drive within certain performance boundaries to achieve a desired score. As another example, a driver could be informed that certain recent actions were improper (e.g., driving along a curve at an excessive speed) and can result in increased premiums. Further, provision of feedback regarding vehicle data and/or contextual information may be utilized to encourage proper maintenance of the vehicle, educate a user about certain issues (e.g., safety) or products (e.g., maintenance services or insurance products), and recommend vendors (e.g., vehicle repair shops). Such feedback may be facilitated by onboard analysis of data and computation of scores by a specially-programmed processor. For example, in some embodiments, the driver is notified when the geographical location of the vehicle is considered a high crime, traffic, or accident rate area. Values for such areas may be assigned based on recent or even real-time data. Further, a route to exit such areas may be provided by systems in accordance with present embodiments. The driver's insurance premium may be adjusted (i.e., increased) if the driver continues driving in the high crime, traffic, or accident rate geographical location. The driver may be proactively notified of when he is nearing/approaching the high crime, traffic, or accident rate geographical location, and alternate routes to avoid such locations may be proactively offered. If the driver consistently avoids the high crime, traffic, or accident rate geographical location over time, then the driver may be rewarded by adjusting (i.e. reducing) the driver's insurance premium. Similarly, if the driver is in the proximity of another driver or vehicle that increases a risk factor (e.g., due to poor condition of vehicle, impairment of the driver, and the like), an indication or route may be provided to move to a safer distance from the other driver or vehicle. In some embodiments, vehicles may communicate with each other in a network to provide information about routes and the other vehicles themselves. For example, a number of vehicles along a route may be in disrepair or being driven aggressively, and, thus, present embodiments may recommend a different route for travel.

Present embodiments may employ various systems and techniques for handling data to improve efficiency associated with transferring information, maintenance of privacy, confirmation of trusted data sources, conservation of data storage, avoidance of unnecessary wireless components and communications, and so forth. For example, present embodiments may employ a block chain distributed database as a repository of vehicle operation and/or contextual information (as data records in the block chain), similar to the block chain utilized by Bitcoin, which may facilitate organized storage and prevent illicit tampering or revision to the data. Further, the block chain repository may establish the vehicle operation and/or contextual information as immutable and trusted. With respect to transmission of data, wireless transmissions may be avoided by performing wired transmissions during charging of docked electric cars that employ present embodiments. If wireless transmissions are still desirable, present embodiments may include features that leverage a communicatively-coupled cellular telephone for wireless capabilities to limit costs associated with an integrated wireless feature. Further, present embodiments may improve (e.g., reduce) data storage by assembling or calculating scores (e.g., risk scores, risk factors, or premium factors) within an onboard system (without requiring transmission of any specific measurement data). This may improve storage efficiency because, for example, all foundational or raw data (e.g., specific operational measurements) that establishes the score may be discarded periodically (e.g., annually) or not stored at all. Further, transmissions may be efficiently limited and privacy maintained by only transmitting the score and not transmitting actual foundational data used to establish the score.

Figure 1:
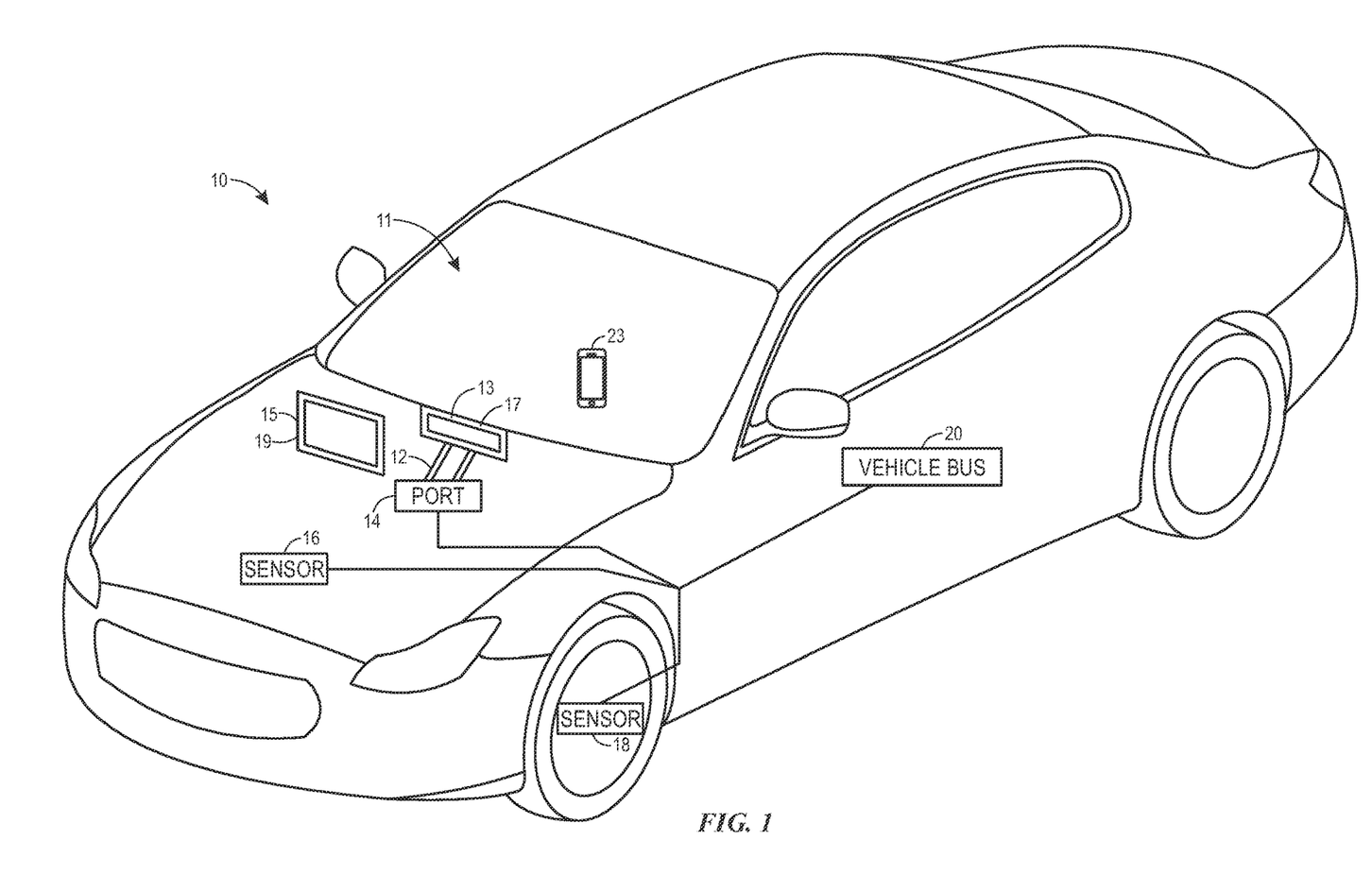
FIG. 1 is a perspective view of a vehicle that includes a monitoring device in accordance with an embodiment of the present disclosure.

With the foregoing in mind, FIG. 1 is a perspective view of a vehicle 10 that includes a monitoring system 11 in accordance with an embodiment of the present disclosure. In some embodiments, the vehicle 10 may be autonomous or semi-autonomous. The monitoring system 11 may monitor the vehicle 10 via an interface with the vehicle 10 or as an integral part of the vehicle 10. In some embodiments, the system 11 includes a monitoring device 12, which may include integral sensors and/or couple to the vehicle 10 such that the monitoring device 12 may access sensor information provided from one or more separate sensors, such as sensors 16, 18, of the vehicle 10. For example, the monitoring device 12 may physically couple to a port 14 of the vehicle that enables access to the sensor information provided from the sensors 16, 18 of the vehicle 10. The port 14 may include an On-Board Diagnostics (OBD) port. The port 14 may support any version of OBD (e.g., OBD-I, OBD-II), any connector type (e.g., SAE J1962) or any proprietary signal protocol (e.g., SAE 1850 PWM, SAE J1850 VPW, ISO9141-2, ISO14230-4 (KWP2000), and ISO 15765-4/SAE J2480 (controller area network (CAN) bus). The port 14 may include any type of physical connection that may enable the monitoring device 12 to communicate with the vehicle 10. For example, the port may support USB, Micro USB, auxiliary, any proprietary physical connections, and so forth. The monitoring device 12 may generate, analyze, modify, and/or relay data related to insurance purposes (e.g., protection against a risk of loss, damage and/or injury to the vehicle 10, to the driver or passengers in the vehicle, or to other vehicles or property). The data may be used to determine and/or adjust an insurance premium that may be based on statistical analysis, models, comparisons, or other evaluations. In some embodiments, the monitoring device 12 or some other component of the system 11 is configured to provide onboard calculations (based on sensor data) to define factors or scores used in insurance adjustment or full calculations of insurance-related values (e.g., calculate an insurance premium). Including onboard features for such calculations may reduce communication (e.g., wireless communication requirements) and provide drivers with rapid access to relevant insurance-related information (e.g., a potential change in an insurance premium or risk assessment based on driving data).

The monitoring device 12 may also couple to the vehicle 10 wirelessly such that the monitoring device 12 may access the sensor information provided by the sensors 16, 18 of the vehicle 10. For example, the monitoring device 12 may couple to the vehicle 10 via WiFi, wireless LAN, Internet, any proprietary wireless connection (e.g., BLUETOOTH), and so forth.

The monitoring device 12 may receive power via the vehicle 10 (e.g., through a battery, generator, alternator of the vehicle 10). In some embodiments, the monitoring device 12 may receive power via an internal power source (e.g., a battery, solar cell of the monitoring device 12).

The monitoring device 12 may include an input and/or output interface. The input interface may be configured to couple the monitoring device 12 to an input device. The input device may include an input device 13 of the monitoring device 12 (e.g., a touchscreen display of the monitoring device 12), a separate input device 13 to be coupled to the monitoring device 12 (e.g., a touchscreen display that may be wirelessly or physically coupled to the monitoring device 12), an input device 15 coupled to the vehicle 10 (e.g., a heads-up display, a stereo/head unit, a factory display unit), or an input device of a separate device, such as a mobile electronic device (e.g., a smartphone or wearable device) that is capable of entering input information. For example, the input device may enable the driver to enter input information related to the vehicle 10, driving behavior, and/or insurance purposes, into the monitoring device 12 to be sent to the insurer or utilized by the system 11. The input information may include driving conditions, the driver's state of mind, a number of passengers, a number of child passengers, a weight of the vehicle, a presence of a school zone, a presence of a construction zone, a presence of nearby emergency vehicles, a presence and/or use of alcohol and/or other controlled substance, a date/time when wearable parts (e.g., tires) of the vehicle 10 are installed, a degree of safety of a geographical location, traffic congestion, accident rates, etc. For example, the driver may input when each of the tires of the vehicle 10 are installed. The monitoring device 12 may calculate a lifespan of each tire, and give warning when the mileage of the vehicle 10 indicates that the lifespan each tire is near. In addition, the insurer may use the information relating to the lifespan of wearable parts of the vehicle 10 to analyze the risk of operating the vehicle 10. In some embodiments, the input device may be used for authentication and/or identification purposes. For example, the driver may enter a vehicle identification number (VIN) and/or a license plate number of the vehicle 10 to identify the vehicle 10 being operated. In some embodiments, the driver may enter a driver's license number or utilize a fingerprint to identify the driver to the insurer or the system 11. In some embodiments, the monitoring device 12 may enable the driver to input the driver's identity, such that, of the insured drivers of the vehicle 10 (e.g., in the case of a family of drivers), the insurer may know which driver is driving the vehicle 10. In some embodiments, the monitoring device 12 may identify the driver by enabling the driver to enter a code (e.g., a sequence of numbers or characters) or biometrically (e.g., by fingerprint).

The monitoring device 12 may include an output interface that may be configured to enable the monitoring device 12 to output information to the driver. The output interface may be configured to couple the monitoring device 12 to an output device. The output device may include an output device 17 of the monitoring device 12 (e.g., a display device of the monitoring device 12), a separate output device 17 coupled to the monitoring device 12 (e.g., a display device that may be wirelessly or physically coupled to the monitoring device 12), an output device 19 of the vehicle 10 (e.g., a heads-up display, a stereo/head unit, a factory display unit), or an output device of a separate device 23, such as a mobile electronic device that is capable of outputting information (e.g., a smartphone, a wearable device, a dashboard camera, an image or video capture device, and the like). The output device 17, 19 may visually and/or audibly communicate information to the driver. For example, the output interface may be configured to output a signal to a video or audio device of the monitoring device 12 or the output device of the separate device 23 to communicate information to the driver.

The monitoring device 12 may include a memory 21 (see FIG. 2) that is integral or attachable. For example, the memory 21 may be inserted into and ejected from the monitoring device 12 to facilitate transfer of information by moving the memory 21 between systems (e.g., the memory 21 may be shipped from the driver to the insurer via mail and used to transfer data to the insurer's system on a periodic basis). In other embodiments, the monitoring device 12 along with its memory 21 may be ejected from the vehicle 10 and transported between systems for information sharing purposes. The memory may enable the driver and/or the insurer to store and review aspects of vehicle operation. In some embodiments, the driver and/or the insurer may be permitted access to all data stored in the memory 21. In some embodiments, the driver and/or the insurer may not be permitted access to certain data stored in the memory 21.

The monitoring device 12 may receive the sensor information provided from the sensors 16, 18 of the vehicle 10. For example, a first sensor 16 may relate to an engine of the vehicle 10, such as an engine start sensor or an oxygen sensor. A second sensor 18 may relate to a wheel of the vehicle 10, such as a wheel speed sensor. The sensors 16, 18 may include any sensors of the vehicle 10. The monitoring device 12, by coupling to the vehicle 10, may access the sensor information provided by the sensors 16, 18. It should be noted that while the sensors 16, 18 are illustrated in specific locations and are specifically referenced in the present disclosure, they are representative of any number or a plurality of sensors of the vehicle 10 which could be positioned in various locations for various different purposes. For example, the plurality of sensors 16, 18 may include a backing sensor (that warns the driver about nearby objects when in a reverse gear), an alcohol/substance use sensor (e.g., a breathalyzer), a weather detection sensor, a temperature sensor, a headlight sensor (detecting when lights of the vehicle are on), a vehicle proximity sensor, etc. Accordingly, the sensors 16, 18 may be generically referred to as the plurality of sensors 16, 18.

As an example, the monitoring device 12 may access sensor information relating to a speed of the vehicle 10 and a run time since a start of the engine of the vehicle 10 provided by sensors 16, 18 by coupling to the vehicle 10. In some embodiments, the monitoring device 12 may access the sensor information provided from more than two sensors of the vehicle 10. In some embodiments, the monitoring device 12 may access the sensor information provided from as little as one sensor of the vehicle 10, such as accessing only the second sensor 18 to determine the speed of the vehicle. In some embodiments, the monitoring device 12 may access a vehicle bus 20 of the vehicle 10, which may be a pathway for numerous communications from the plurality of sensors 16, 18. The vehicle bus 20 may include a communication network that connects components of the vehicle 10, including the sensors 16, 18 (a plurality of sensors). The vehicle bus 20 may operate under any communication protocol (e.g., Controller Area Network (CAN), Local Interconnect Network (LIN), Ethernet, TCP/IP). The monitoring device 12 may access the vehicle bus 20 of the vehicle 10 and receive vehicle operation information provided by the sensors 16, 18 of the vehicle 10. The monitoring device 12 may also receive contextual information via direct communication with sensors (e.g., sensors 16, 20), via the vehicle bus 20 (e.g., from a link to the Internet or from local sensors in communication with the vehicle bus 20), via a communication device of the vehicle 10 (e.g., that may exchange information with another communication device of another vehicle), or via one or more other devices 23 capable of communication with the monitoring device 12, such as a smartphone in the vehicle 10, a cellular device integral with the vehicle 10, and the like.

Figure 2:
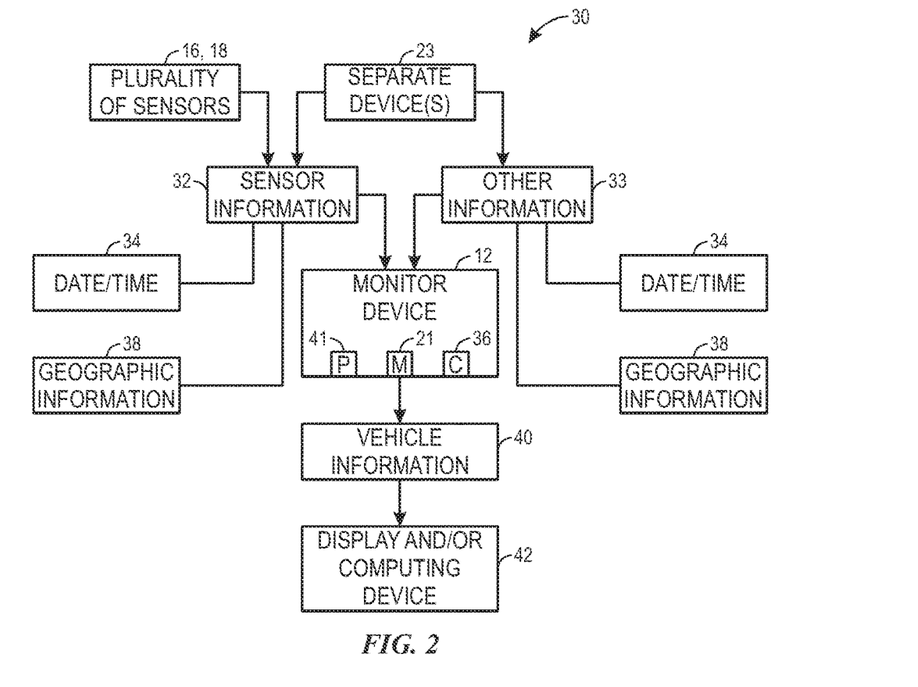
FIG. 2 is a diagram of a communication and monitoring system that includes the monitoring device in accordance with an embodiment of the present disclosure.

With the foregoing in mind, FIG. 2 is a diagram of a communication and monitoring system 30 that includes the monitoring device 12 in accordance with an embodiment of the present disclosure. The monitoring device 12 may receive sensor information 32 provided from one or more of the plurality of sensors 16, 18 of the vehicle 10. This sensor information 32 may include data related to operation of the vehicle 10 and/or contextual information (e.g., moisture measurements). Further, the monitoring device 12 may receive the sensor information 32 and/or other information 33 (e.g., including contextual information) from the one or more other devices 23 (e.g., a driver's smartphone, a passenger's wearable device, an integral cellular device, a communication device of the vehicle 10, a dashboard camera, a video device, and the like). For example, in the illustrated embodiment of FIG. 2, the device 23 may be a smartphone configured to provide the sensor information 32 (e.g., vehicular movement data from integral gyroscopes within the device 23) and/or the other information 33 (e.g., weather or traffic data) from a link to the Internet. In some embodiments, the device 23 may be a front-facing camera (e.g., a dashboard camera) that includes a frame rate sufficient to provide image/video information related to driving conditions, such as road hazards, other drivers of other vehicles that are within a viewing distance of the vehicle (e.g., whether other drivers are focused on the road), and the like. In some embodiments, the device may be a rear-facing camera that may provide image/video information related to the driver (e.g., whether the driver is focusing on the road), passengers in the vehicle 10, and the like. In some embodiments, the device 23 may be a wearable device such as a personal health monitoring device that provides information related to the driver's health status (e.g., heartrate).

The monitoring device 12 may receive date-time information 34 and geographical information 38 from the plurality of vehicle sensors 16, 18, from the one or more other devices 23, or from both. This date-time information 34 and geographical information 38 may facilitate linking vehicle operation data (i.e., the sensor information 32) with contextual information (i.e., the other information 33). For example, the monitoring device 12 may receive the sensor information 32 related to the speed and location of the vehicle 10, receive the date-time information 34 related to when the vehicle 10 was operating at the speed provided in the sensor information 32, and receive the other information 33 (e.g., including weather or traffic conditions, other driver or vehicle conditions, passenger actions, driver health status, and the like) corresponding to the date-time and location of the vehicle 10 when it was operating at the speed provided in the sensor information 32. Assembling this information may facilitate analysis of the measured speed within the context of the conditions surrounding the vehicle 10 at the time the measurements were taken, which may facilitate risk analysis and so forth.

The monitoring device 12 may receive the date-time information 34 from a clock of the vehicle 10. For example, the monitoring device 12 may receive the date-time information 34 via the vehicle bus 20 of the vehicle 10, which may transmit data from an onboard clock. In one embodiment, the monitoring device 12 may receive the date-time information 34 via the port 14 or wirelessly (e.g., from the other device 23). Multiple sources of date-time information may be utilized to avoid errors that could be associated with reliance on a single source. For example, conflicting time data from a local clock and a clock of the device 23 may nullify certain contextual information. In some embodiments, time data may be checked with other information to confirm an appropriate time. In some embodiments, the monitoring device 12 may include a communication device 36 (e.g., a communication interface) that enables the monitoring device 12 to receive the date-time information 34 over a communication network. For example, the communication device 36 may include a network interface that enables access to the communication network, such as the Internet. Accordingly, the monitoring device 12 may receive the date-time information 34 related to the sensor information 32 via the communication device 36. In other embodiments, the monitoring device 12 may essentially incorporate a communication feature of the other device 23 (e.g., a smartphone) and utilize it to avoid the expense of including a built-in communication device 36.

As noted above, the monitoring device 12 may also receive the geographical information 38 related to the sensor information 32. For example, the monitoring device 12 may receive the sensor information 32 related to the speed of the vehicle 10 and the geographical information 38 related to where the vehicle 10 was operating at the speed provided in the sensor information 32. The monitoring device 12 may receive the geographical information 38 from a geographical location device of the vehicle 10 (e.g., a device that may receive global positioning system (GPS) signals, a different type of GPS-related signal, other location protocol). For example, the monitoring device 12 may receive the geographical information 38 via the vehicle bus 20 of the vehicle 10, which may be communicatively coupled with the GPS system. The monitoring device 12 may receive the geographical information 38 via the port 14 or wirelessly. In some embodiments, the monitoring device 12 may use the communication device 36 that enables the monitoring device 12 to receive the geographical information 38 related to the sensor information 32 via the communication device 36 over a communication network. For example, the communication device 36 may include a network interface that enables access to the communication network, such as the Internet.

In some embodiments, the sensor information 32 (e.g., operational measurement data) and the other information 33 (e.g., the date-time information 34, the geographical information 38) may make up information utilized (e.g., processed, analyzed, sent) by the monitoring device 12. In some embodiments, input information 39 may also be utilized by the monitoring device 12. The input information 39 may be provided via the one or more separate devices 23, the input device 15, a direct interface with the monitoring device 12, or the like. The processed and/or transmitted information from the monitoring device 12 may be referred to as vehicle information 40, which may include (e.g., only include) a calculated risk value or some other value based on the various pieces of information provided to the monitoring device 12.

The monitoring device 12 may include one or more processors 41 that enable the monitoring device 12 to modify or generate the vehicle information 40, such that the vehicle information 40 is suitable for transfer to a display and/or computing device 42. For example, a processor 41 may be configured to select certain relevant data from the vehicle information 40 and package it (e.g., calculate a risk value or generate/update a block chain) such that it is ready for transfer to the computing device 42 for additional processing. As another example, the data received by the monitoring device 12 may be processed (e.g., via the processor 41 and/or the computing device 42) to provide a potential change in the driver's insurance premium or a related score for transmission to a display of the computing device 42 for viewing by the driver as the vehicle information 40 to encourage a change in driving by the driver. In some embodiments, the processor 41 may compress the vehicle information 40 or the relevant data from the vehicle information 40 such that transferring the vehicle information 40 is more convenient. For example, such information may be compressed for transmission to other systems 11 of other vehicles in a network for evaluation by the respective systems 11 of those separate vehicles (e.g., for routing purposes). It is noted that references to "vehicle information 40" in this disclosure may refer to any portion and/or form of the sensor information 32 as received from the sensors 16, 18 of the vehicle 10, the date-time information 34 related to the sensor information 32, the geographical information 38 related to the sensor information 32, the other information 33, the input information 39, including modifications to the vehicle information 40, such as selecting relevant data from the vehicle information 40 and compressing the vehicle information 40 or calculating a score as the vehicle information 40.

The computing device 42 may include a server, computer, laptop, PC, mobile device, or the like that includes a processor, a memory, and a communication device. The computing device 42 may include a plurality of computing devices connected together, e.g., via a network. The processor may include any general purpose or application-specific processor. The memory may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by a processor (e.g., the processor) or by any general purpose or special purpose computer or other machine with a processor (e.g., the processor). In some embodiments, the computing device 42 may reside with, be accessed by, and/or be managed by the insurer. It should be noted that, in some embodiments, the computing device 42 may be the same as the monitoring device 12 such that the computing device 42 may output information via the output device 17 of the monitoring device 12 (e.g., a display device of the monitoring device 12), the separate output device 17 coupled to the monitoring device 12 (e.g., a display device that may be wirelessly or physically coupled to the monitoring device 12), or the output device 19 of the vehicle 10 (e.g., a heads-up display, a stereo/head unit, a factory display unit). In some embodiments, the computing device 42 may be the same as the separate device 23, such that the computing device 42 may output information via an output device of the separate device 23 (e.g., a driver's smartphone, a passenger's wearable device, or an integral cellular device).

The monitoring device 12 may send the vehicle information 40 to the computing device 42 via the communication device 36. For example, the communication device 36 may include a network interface that enables access to a communication network, such as the Internet. The communication device 36 may enable the monitoring device 12 to send the vehicle information 40 to the computing device 42 via the communication network. In some embodiments, the communication device 36 may send the vehicle information 40 to the computing device 42 via cloud computing. In embodiments where the computing device 42 is the same as the output device 17 of the monitoring device 12, the separate output device 17 coupled to the monitoring device 12, or the output device 19 of the vehicle 10, the monitoring device 12 may send the vehicle information 40 via a wired connection to the output device 17, 19. In embodiments where the computing device 42 is the separate device 23, the computing device 42 may send the vehicle information 40 via a connection to the separate device 23 (e.g., a wired connection, a wireless connection via WiFi, wireless LAN, internet, any proprietary wireless connection (e.g., BLUETOOTH), and so forth).

In some embodiments, the monitoring device 12 may be configured to provide routing for the vehicle 10 to avoid geographical areas, based on the sensor information 32 and the other information 33. For example, the driver may desire to avoid geographical areas that evidence high traffic, higher accident rates (e.g., based on claim data from the insurer), high crime rates, etc. The monitoring device 12 may be configured to store and/or retrieve these geographical areas using the memory device 21 and/or the communication device 36. The monitoring device 12 may offer routes for the driver to avoid these undesirable geographical areas. In some embodiments, the driver's route history may be analyzed to determine undesirable geographical areas to avoid, such that avoiding the undesirable geographical areas may result in a decrease of the driver's insurance premium and safer vehicle operation. Similarly, if the driver is in the proximity of another driver or vehicle that increases a risk factor (e.g., due to poor condition of vehicle, impairment of the driver, evidence of the other driver not focusing on the road, and the like), an indication or route may be provided to move to a safer distance from the other driver or vehicle.

The monitoring device 12 may send the vehicle information 40 synchronously (e.g., constantly and/or as the vehicle information 40 becomes available). In some embodiments, the monitoring device 12 may send the vehicle information asynchronously. For example, the monitoring device 12 may store the vehicle information in a memory until a memory threshold has been reach. When the memory threshold has been reached, the monitoring device 12 may send the vehicle information 40. In some embodiments, the monitoring device 12 may identify a triggering event that prompts the monitoring device 12 to record and/or send the information. The triggering event may include an indication that the driver is starting the vehicle 10. For example, the triggering event may include an ignition of the engine of the vehicle 10, an indication that the vehicle 10 is moving, etc. The triggering event may relate to an indication that a traffic incident involving the vehicle 10 has occurred. For example, the triggering event may include an airbag deploying, surpassing a deceleration threshold, a traction alert occurring, etc. The triggering event may relate to an increase in risk related to driving behavior. For example, the triggering event may include the vehicle 10 traveling at a speed in excess of a speed limit. The processor 41 of the monitoring device 12 may be configured to identify a speed limit of a geographical area when the vehicle 10 is traveling in the geographical area. The processor 41 of the monitoring device 12 may be further configured to receive the speed of the vehicle 10 while the vehicle 10 is traveling in the geographical area. If the processor 41 determines that the speed of the vehicle 10 while the vehicle 10 is traveling in the geographical area is in excess of the speed limit of the geographical area, the processor 41 may initiate sending the vehicle information 40.

In certain embodiments, the information related to a trigger event (or periodic data reports) may be stored online in a distributed database, similar to the block chain utilized by Bitcoin. For example, a public distributed database record may be created online for a trigger event, such as a major freeway accident or a bridge collapse, and any Internet-connected devices that are monitoring or recording aspects of the environment near the accident can update the record with any relevant monitoring data via an Internet connection. A block chain may be used to inform subsequent drivers via the monitoring device 12 of traffic conditions and accidents. The block chain may also be used to provide real-time feedback to the driver. For example, the block chain may be accessed to inform the driver that the driver executed a sharp turn at an unsafe speed. In certain embodiments, even a human witness may update the distributed database record (e.g., via a mobile device located near the incident) with a personal account of the incident and/or contact information in case of further inquiry. Additionally, in certain embodiments, the public distributed database record may be inspected by any device with the proper authorization (e.g., proper decryption keys or certificate) and, thereby, the record can self-document its own authenticity. For example, only the monitoring device 12 having suitable decryption keys would be capable of decrypting the entire distributed database record and reading the information regarding the incident stored therein.

The triggering event may result in contacting the driver, an insurer, or another third party. For example, the triggering event may include a request for assistance. As a result, the monitoring device 12 may notify an emergency contact, an emergency service, and/or the insurer. As another example, the triggering event may include accident occurrence, wherein the occurrence may be determined by monitoring the sensor 16, 18, such as the airbag deploying. In some embodiments, the triggering event may include a request for assistance, wherein the request may be determined through the pressing of an emergency button in the vehicle 10, reading the sensor 16, 18 (e.g., the airbag deploying), etc. The triggering event may include an unsafe operation of the vehicle 10 or be based on the health status of the driver (e.g., as provided by a wearable personal health monitoring device). In some embodiments, the monitoring device 12 may record and/or save the triggering event to upload and/or stream to the driver and/or insurer. In some embodiments, repeated trigger events may result in notification of the driver of the unsafe operation. For example, the triggering event may include excessive speed, wherein reading the sensor 16, 18 may indicate the vehicle 10 is exceeding a speed limit, and the driver may be informed of such excess. A duration of the triggering event may also be measured to determine if the behavior is prolonged. The triggering event may include a presence of alcohol or a controlled substance, wherein a level of alcohol or the controlled substance and/or their use may be determined by using one or more of the sensors 16, 18 (e.g., an air content analyzer, breath analyzer, or other any other alcohol or controlled substance-identifying device) that may identify driver impairment (e.g., touch or a pattern matching behavior). The triggering event may include not using a seatbelt and/or turn signals. The triggering event may also include use of an anti-lock braking system (ABS) without an occurrence of an accident.

In some embodiments, an insurer, via the computing device 42, may request and/or retrieve the sensor information 32 and/or the other information 33. The insurer may do so synchronously (e.g., at regular intervals) or asynchronously (e.g., after an indication of the triggering event, at high traffic times of day, etc.). Thus, in some embodiments, data can be retrieved by accessing (reaching into) the data from an approved outside computing device 42 rather than merely reported out to the outside computing device 42 from the system 11.

The sensor information 32 and/or the other information 33 may be used to generate a score. In some embodiments, the monitoring device 12 may send the vehicle information 40 in the form of the score or an adjustment to the insurance premium to the computing device 42. In one embodiment, the score is represented by a risk factor. The risk factor may provide an indication of whether the risk information suggests safe or risky behavior. For example, if the risk information reveals that the driver was driving the vehicle 10 at an excessive speed during rainy weather conditions, the computing device 42 may generate the risk factor indicating a higher risk associated with the driver. In some embodiments, the risk factor may be represented numerically based on a scale of behavior indicating safe to risky behavior. For example, the scale may range from 1 to 10, wherein 1 indicates a safest behavior while 10 indicates a riskiest behavior. The risk factor may be a basis for the insurer or the algorithm to determine and/or adjust the driver's insurance premium. For example, the insurer may have a risk value associated with each of its insured drivers, on which it bases the driver's insurance premium. The insurer may adjust the risk value based on the risk factor, which may result in determining and/or adjusting the driver's insurance premium. Other factors may be realized and factored into the risk factor, the risk value, and/or insurance premium. One or more of these values may be displayed to the driver (e.g., in an informative or game-based context) to encourage certain driving characteristics. In one embodiment, a level of willingness of the driver to permit the vehicle operation to be monitored and/or recorded by the monitoring device 12 may decrease the risk factor and/or the insurance premium. This may be because drivers that believe they are safer drivers may be more willing to have their vehicle operation monitored and/or recorded, and vice versa. In some embodiments, the score may be reported in the form of a "delta" or a difference between an original score and a current score. The difference may demonstrate improvement or decline in a driver rating. For example, based on the score generated based on the sensor information 32 and/or the other information 33, a delta score may be generated based on how the score changes over time. The delta score may reflect a relationship between risk and responsibility. These scores may be presented via a user interface of the system to encourage changes to driving habits.

The computing device 42 may be configured to determine and/or adjust the driver's insurance premium based on the risk factor. For example, a higher risk factor may result in an increase of the driver's insurance premium, while a lower risk factor may result in a decrease of the driver's insurance premium. In some cases, a risk factor may result in no change to the driver's insurance premium. In some embodiments, the delta score may be used to determine and/or adjust the driver's insurance premium. The insurer may make insurance plan decisions based on the risk factor and/or the risk value. For example, the insurer may not want to offer a long-term insurance plan to a driver that has a higher risk value or vehicle operations resulting in higher risk factors. Instead, the insurer may only offer short-term insurance plans to such drivers. The insurer may leverage the risk factor to price usage-based insurance charges (e.g., for temporary or trip-based insurance coverage). For example, if the risk value of the driver is high, then for usage-based insurance offers, the insurer may offer coverage at a proportionately high cost (and vice versa). Further, usage-based rates may be estimated with the understanding that actual charges will apply based on monitored performance and real-time or essentially real-time updates to the cost (e.g., increases or decreases to the estimate) may be provided to the driver based on monitoring operational data and/or contextual information. In some embodiments, operations of the computing device 42 may be performed by the monitoring device 12. For example, the monitoring device 12 may calculate the risk factor, which may then be provided in any of various forms (e.g., a graphic, numerical data, a warning, a potential insurance premium change, a block chain) to the driver, the insurance company, and/or a third party. As noted above, this may increase privacy, limit requirements for data transfer, and so forth.

Figure 3:
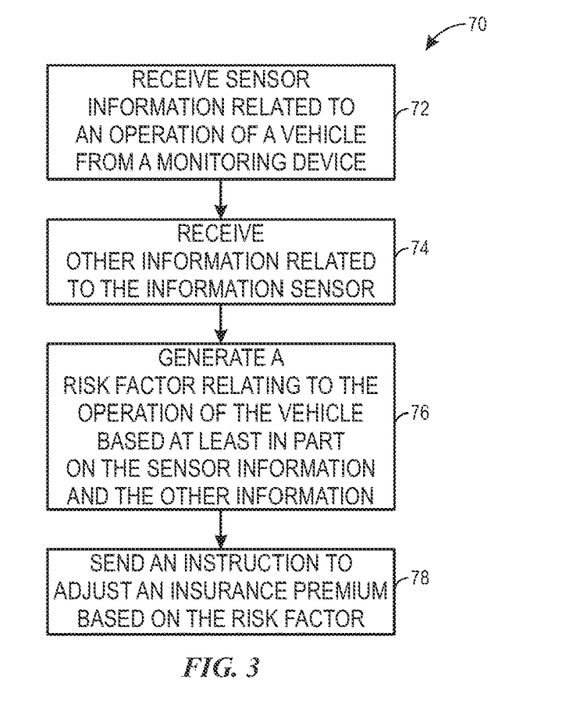
FIG. 3 is a flowchart illustrating a method for adjusting and/or determining an insurance-related value (e.g., insurance premium) based on an operation of the vehicle in accordance with an embodiment of the present disclosure.

Turning now to FIG. 3, a flowchart that illustrates a method 70 for determining and/or adjusting an insurance premium (which may be considered an example of a score) based on an operation of the vehicle 10 is presented in accordance with an embodiment of the present disclosure. The method 70 includes receiving (block 72) sensor information 32 related to an operation of the vehicle 10 from the plurality of sensors 16, 18 and/or the monitoring device 12. In some embodiments, the sensor information 32 may be received as a result of an asynchronous triggering event involving the vehicle 10. In some embodiments, the sensor information 32 may be received as a result of synchronous reporting or access to the sensors 16, 18 by the monitoring device 12. The sensor information 32 may include information provided from sensors 16, 18 integral with systems of the vehicle, coupled with the vehicle, and/or disposed in or around the vehicle. The sensor information 32 may be used to receive (block 74) the other information 33 (e.g., including the contextual information), which may be based on other information and algorithms related to the vehicle 10 and/or the driver, such as the input information 39. The other information 33 may also incorporate any information related to the triggering event (e.g., speed of the vehicle 10, acceleration/deceleration of the vehicle 10, report of any indicators of the vehicle 10). For example, the other information 33 may include or be based on the speed, the time, the date, and the location of the vehicle 10, wherein the triggering event includes the vehicle 10 operating in excess of a speed limit. In some embodiments, the monitoring device 12 or the insurer may receive the other information 33 via the computing device 42. It should be noted that, in some embodiments, the computing device 42 may be the same as the monitoring device 12 or the separate device 23 (e.g., a driver's smartphone, a passenger's wearable device, or an integral cellular device). The monitoring device 12 or insurer may use the computing device 42 to access the communication network via the communication device to receive the other information 33. The other information 33 may include weather information, road conditions, road hazards, road obstacles, construction zones, school zones, nearby accidents, nearby emergency vehicles, natural disasters, a degree of safety of a geographical location, traffic congestion, accident rates, etc. For example, the time, date, and location of the vehicle 10 during the triggering event when and where the vehicle 10 was operating in excess of the speed limit may be used by the computing device 42 to determine wet driving conditions at the time, date, and location of the vehicle 10. As another example, the monitoring device 12 may determine a degree of safety associated with the geographical location of the vehicle 10 such that the geographical location is considered a "high crime" area (based on geo-fencing). In some embodiments, the other information 33 includes information related to other vehicles in a proximity to the driver's vehicle. For example, information may be collected by a communication device (e.g., the device 23 or the communication device 36 of the monitoring device 12) of the driver's vehicle that is associated with a condition of another vehicle (or plurality of vehicles) or another driver of another vehicle (or a plurality of drivers of other vehicles) due to poor condition of the vehicle, impairment of the driver, or the like. The other information 33 may include, for example, a number or percentage of proximate vehicles that are autonomous or semi-autonomous, and associate the number or percentage of such vehicles with increased or decreased risk.

The monitoring device 12 or the insurer (e.g., the computing device 42) may generate (block 76) a risk factor relating to the operation of the vehicle 10 based at least in part on the sensor information 32 (or the vehicle information) and the contextual information. For example, based on the speed of the vehicle 10, the vehicle 10 exceeding the speed limit, and the wet driving conditions, the insurer may generate a high risk factor to the operation of the vehicle 10. In some embodiments, the risk factor may be based at least in part on other information related to the vehicle 10 and/or the driver. For example, the risk factor may be based at least in part on the historical information related to the vehicle 10 and/or the driver. As another example, in some embodiments, the driver is notified when the geographical location of the vehicle is considered a "high crime" area. If the driver consistently drives in the high crime geographical location, a high risk factor may be generated. In some embodiments, if the driver is in the proximity of another driver or vehicle that exhibits poor condition (e.g., tires of the other vehicle should be replaced, impairment of the driver, and the like), a risk factor may be increased. In some embodiments, the insurer may generate the risk factor via the computing device 42. For example, the computing device 42 may include a software program (e.g., risk analysis software or insurance-related risk analysis software) stored in the memory that is configured to generate the risk factor based on information relating to vehicle operation. The computing device 42 may run the software program via the processor to generate the risk factor. In some embodiments, the software program may be included in the system 11 (e.g., in the monitoring device 12). In some embodiments, the risk factor may be generated and sent by the monitoring device 12 to the computing device 42 to update the driver of a result of the operation of the vehicle 10.

The insurer or the algorithm (e.g., integrated with the system 11) may send an (block 78) instruction to adjust an insurance premium based on the risk factor. In some embodiments, the insurer may determine the insurance premium based on the risk factor. The insurer may use an algorithm that includes appropriately adjusting the insurance premium of the driver based on the risk factor. For example, if a high risk factor is generated because the driver consistently drives in the high crime geographical location, the driver's insurance premium may be adjusted (i.e., increased). In some embodiments, the insurer may send an instruction to adjust the insurance premium via the computing device 42. For example, the computing device 42 may include a software program stored in the memory that is configured to adjust the insurance premium based on the risk factor. The computing device 42 may run the software program via the processor to adjust the insurance premium. Alternatively, the monitoring device 12 may send the instruction to adjust the insurance premium based on the risk factor. In some cases, the risk factor may result in a zero adjustment to the insurance premium (i.e., no change to the insurance premium).

Figure 4:
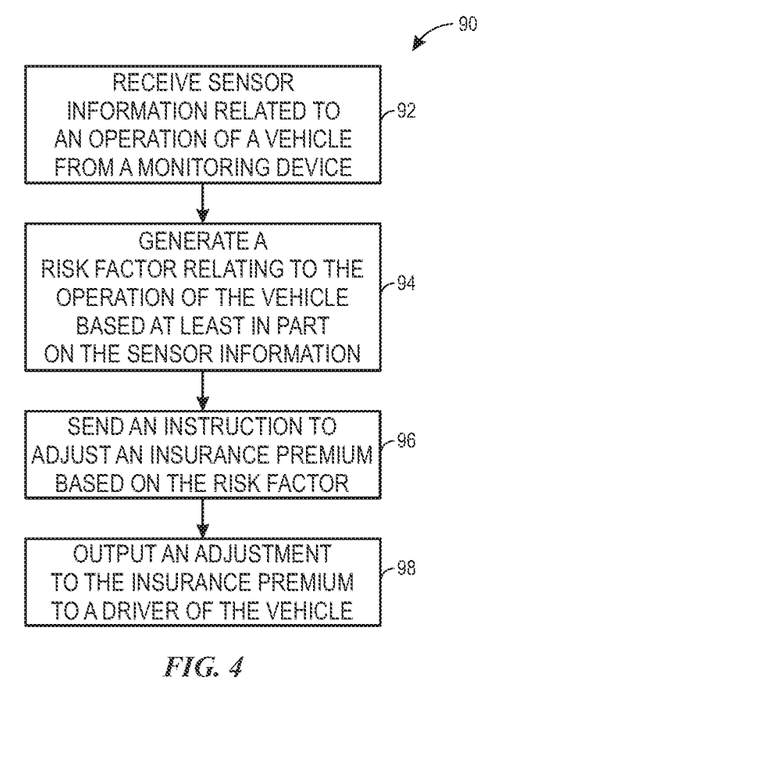
FIG. 4 is a flowchart illustrating a method for adjusting and/or determining the insurance-related value that includes communicating feedback related to vehicle operation to a driver, in accordance with an embodiment of the present disclosure.

In some embodiments, the monitoring device 12 may enable the driver of the vehicle 10 to view how the driver's vehicle operation affects the driver's insurance premium. In particular, the monitoring device 12 may be configured to communicate to the driver that the driver's vehicle operation has resulted in an increasing, decreasing, or unchanged insurance premium. This may be done via communication of the vehicle information 40, which may include a score such as the risk factor. For example, FIG. 4 is a flowchart illustrating a method 90 for adjusting and/or determining the insurance premium that includes communicating feedback to the driver related to vehicle operation, in accordance with an embodiment. The method 90 includes receiving (block 92) sensor information 32 related to an operation of the vehicle 10 from the monitoring device 12. In some embodiments, the sensor information 32 may be received as a result of an asynchronous triggering event involving the vehicle 10. In some embodiments, the sensor information 32 may be received as a result of synchronous reporting by the monitoring device 12. The sensor information 32 may include or be based on any information related to the sensor information 32, such as the date-time information 34 and the geographical information 38.

The insurer (e.g., the computing device 42) or the algorithm (e.g., an algorithm performed by the system 11 or specifically the monitoring device 12) may generate (block 94) a risk factor relating to the operation of the vehicle 10 based at least in part on the sensor information 32 or the available data. In some embodiments, the risk factor may also be based at least in part on other information related to the vehicle 10 and/or the driver, such as the input information 39 or the other information 33. The vehicle information 40 may also include or be based on any information related to the triggering event (e.g., speed of the vehicle 10, acceleration/deceleration of the vehicle 10, report of any indicators of the vehicle 10, etc.). For example, based on the speed of the vehicle 10 and the vehicle 10 exceeding the speed limit, the insurer may generate a high risk factor to the operation of the vehicle 10. In some embodiments, the insurer may generate the risk factor via the computing device 42. For example, the computing device 42 or the monitoring device 12 may include a software program stored in the memory that is configured to generate the risk factor based on information relating to vehicle operation. The computing device 42 may run the software program via the processor to generate the risk factor.

The insurer (e.g., the computing device 42) or the algorithm (e.g., an algorithm performed by the system 11 or specifically the monitoring device 12) may send (block 96) an instruction to adjust an insurance premium based on the risk factor. In some embodiments, this may include an initial or full determination of the insurance premium (rather than modifying an existing premium) based on the risk factor. The computing device 42 or system 11 may use an algorithm that includes sending an instruction to appropriately adjusting the insurance premium of the driver based on the risk factor. In some embodiments, the insurer may send an instruction to adjust the insurance premium via the computing device 42. For example, the computing device 42 may include a software program stored in the memory that is configured to adjust the insurance premium based on the risk factor. The computing device 42 may run the software program via the processor to adjust the insurance premium. In some cases, the risk factor may result in a zero adjustment to the insurance premium (i.e., no change to the insurance premium). Similarly, such calculation and adjustment may be performed by the monitoring device 12, for example.

The adjustment, score, or change related to the insurance premium may be output or communicated (block 98) to the driver of the vehicle 10 via the monitoring device 12. In particular, the monitoring device 12 may be configured to communicate to the driver, through the output interface of the monitoring device 12, that the vehicle operation has resulted in or could (if certain behaviors persist) result in the adjustment to the insurance premium. In cases where there is zero adjustment to the insurance premium, the insurer may communicate to the driver that the driver's vehicle operation resulted in no change to the insurance premium. In some embodiments, the adjustment (and/or lack of the adjustment) to the insurance premium may be communicated through a score (e.g., 0 to 100%, 0 to 10, letter grades of A-F, 0 to 5 stars, etc.). In some embodiments, the adjustment to the insurance premium may be communicated by showing or stating a financial cost of the adjustment to the insurance premium. In some embodiments, the monitoring device 12 may communicate with the driver via the output device 17 of the monitoring device 12 (e.g., a display device of the monitoring device 12). In some embodiments, the monitoring device 12 may communicate with the driver via the output interface and the separate output device 17 coupled to the monitoring device 12 (e.g., a display device that may be wirelessly or physically coupled to the monitoring device 12). In some embodiments, the monitoring device 12 may communicate with the driver via the output interface and the output device 19 of the vehicle 10 (e.g., a heads-up display, a stereo/head unit, a factory display unit, etc.). In some embodiments, the output interface may be configured to connect to the separate device 23, which may include mobile electronic devices of the driver, such as a smartphone, wearable (e.g., "smart" watch), etc., and output information to the devices of the driver. In some embodiments, the monitoring device 12 may communicate with the driver in real-time. In particular, the monitoring device 12 may report the adjustment to the insurance premium as a result of the triggering event during the event or immediately after the triggering event occurs. For example, in some embodiments, the driver is notified when the geographical location of the vehicle is considered a "high crime" area. The driver may be notified that the driver's insurance premium may be adjusted (i.e., increased) if the driver continues driving in the high crime geographical location. The driver may be notified when the driver's insurance premium is adjusted. For synchronously reported vehicle operation, the monitoring device 12 may report the adjustment to the insurance premium as a result of the vehicle operation as or immediately after the vehicle operation occurs.

The driver may adjust vehicle operation behaviors in an effort to minimize behaviors that result in increasing the driver's insurance premium and maximize behaviors that result in decreasing the driver's insurance premium. Because the behaviors that result in increasing the driver's insurance premium may be directly linked to higher risk actions, the driver may learn to avoid those actions. On the other hand, the insurer may reward or design its algorithm/software to reward actions that show conscientious vehicle operation. For example, driving at or below a posted speed limit in school zones, construction zones, during weather indicating poor driving conditions, while an emergency vehicle is passing, may result in a lower insurance premium as a reward from the insurer. As another example, if the driver consistently operates the vehicle 10 in a high crime geographical location, the monitoring device 12 may offer alternate routes to avoid the high crime geographical location. If the driver consistently avoids the high crime geographical location over time, then the driver may be rewarded by adjusting (i.e. reducing) the driver's insurance premium. Similarly, if the driver consistently exits a proximity of another driver or vehicle that increases the risk factor (e.g., due to poor condition of vehicle, impairment of the driver, and the like), the driver may be rewarded by adjusting (i.e., reducing the driver's insurance premium. In some embodiments, the insurer may reward the driver based on the driver keeping his score/risk factor above a threshold score/risk factor.

In some embodiments, the monitoring device 12 may be enabled to operate with a subset of its functions. For example, the monitoring device 12 may be enabled to only gather the speed of the vehicle 10 and information related to speed limits. This may enable a driver covered by the insurer to select an insurance plan using the monitoring device 12 where the monitoring device 12 only uses a driver-selected subset of its functions.

In some embodiments, the risk information of the driver and other drivers may be stored in a database, such as in memory. The insurer may aggregate and analyze the risk information of the drivers to establish relationships between drivers, driver profiles, and risk. The insurer may use the aggregated risk information for insurance and/or non-insurance purposes (e.g., marketing, road design).

In some embodiments, the risk information of the driver and/or the aggregated risk information may be accessed by the driver. For example, the driver, through the insurer's website, application, or mobile application (e.g., an "app"), may view the driver's risk information, risk factor, and/or insurance premium. The driver may also compare the driver's risk information, risk factor, and/or insurance premium to the risk information, risk factor, and/or insurance premium of other drivers. For example, the driver may be able to filter at least a portion of the aggregated risk information to compare risk information with that of other drivers who have similar characteristics to the driver (e.g., age, gender, location, the vehicle 10). Enabling the driver to compare the driver's risk information, risk factor, and/or insurance premium to that of other drivers may encourage a driver with a higher risk factor to drive safer and/or enforce safe driving behaviors of a driver with a lower risk factor.

In some embodiments, the driver may enter the risk information at the insurer's website, application, or mobile application (e.g., an "app"), and the computing device 42 may provide a resulting risk factor, risk value, adjustment to an insurance premium, and/or insurance premium. For example, the driver may be able to enter a speed of the vehicle 10 at an input location and the insurer may provide the resulting risk factor. The computing device 42 may provide the driver's risk information, vehicle information, contextual information, etc. as default information. For example, the driver may be able to access the driver's risk information for a specific trip, including a date, time, location, vehicle speed, and any other information related to the driver and the vehicle 10 during the specific trip. The driver may change one or more details of the specific trip (e.g., the speed of the vehicle 10) to view how the risk factor, risk value, and/or insurance premium would be affected.

In some embodiments, a potential insured driver may wish to "try out" the monitoring device 12 for the purpose of providing information to the insurer such that the insurer may provide a quote to insure the potential insured driver based on the driver's vehicle operation. The insurer may use the vehicle information 40 sent by the monitoring device 12 to provide an accurate insurance quote to the potential insured driver. The insurer may allow the potential insured driver to access the risk information gathered pertaining to the potential insured driver, as well as access at least a portion of the aggregated risk information.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A system comprising:
a monitoring device coupled to a vehicle, comprising:
a communication interface; and
one or more processors coupled to the communication interface, wherein the one or more processors are configured to:
receive, via the communication interface, a geographical location of the vehicle, a speed of the vehicle, a route for the vehicle, and an indication of a presence of an emergency vehicle along the route;
receive, via the communication interface, a first risk factor from a computing device, wherein the computing device is configured to generate the first risk factor based at least in part on the speed of the vehicle and the indication of the presence of the emergency vehicle using risk analysis software;
provide an alternative route for the vehicle to avoid the emergency vehicle;
receive, via the communication interface, a second risk factor from the computing device, wherein the computing device is configured to generate the second risk factor based at least in part on receiving an indication that the vehicle followed the alternative route; and
send an instruction to decrease an insurance premium of a driver of the vehicle based at least in part on determining that the second risk factor is less than the first risk factor.

2. The system of claim 1, wherein the computing device is configured to determine an adjustment to the insurance premium, an adjustment to an insurance deductible, or a payment amount using the insurance-related risk analysis software, based at least in part on the second risk factor.

3. The system of claim 1, wherein the one or more processors are configured to receive image or video information from the monitoring device or an electronic device disposed in the vehicle.

4. The system of claim 1, wherein the one or more processors are configured to receive, via the communication interface, a third risk factor from the computing device, wherein the computing device is configured to generate the third risk factor based at least in part on determining that the speed of the vehicle is above a speed limit associated with the geographical location when the emergency vehicle is present in the geographical location.

5. The system of claim 4, wherein the one or more processors are configured to send a second instruction to increase the insurance premium of the driver of the vehicle based at least in part on determining that the third risk factor is greater than the second risk factor.

6. The system of claim 2, wherein an electronic device disposed in the vehicle is configured to output the adjustment to the insurance premium, the adjustment to the insurance deductible, or the payment amount.

7. The system of claim 1, wherein the one or more processors are configured to:
receive, via the communication interface, a speed of the vehicle from a sensor of the vehicle or an electronic device disposed in the vehicle and a speed limit associated with the geographical location; and
determine that the speed of the vehicle is below the speed limit associated with the geographical location when the emergency vehicle is present in the geographical location.

8. The system of claim 7, wherein the computing device is configured to generate the second risk factor based at least in part on determining that the speed of the vehicle is below the speed limit associated with the geographical location when the emergency vehicle is present in the geographical location.

9. A method comprising:
receiving, via one or more processors, a geographical location of a vehicle, a speed of the vehicle, a route for the vehicle, and an indication of a presence of an emergency vehicle along the route;
generating, via the one or more processors, a first risk factor based at least in part on the speed of the vehicle and the indication of the presence of the emergency vehicle using risk analysis software;
providing, via the one or more processors, an alternative route for the vehicle to avoid the emergency vehicle;
generating, via the one or more processors, a second risk factor based at least in part on receiving an indication that the vehicle followed the alternative route; and
sending, via the one or more processors, an instruction to decrease an insurance premium of a driver of the vehicle based at least in part on determining that the second risk factor is less than the first risk factor.

10. The method of claim 9, comprising receiving, via the one or more processors, image or video information from a monitoring device or an electronic device disposed in the vehicle.

11. The method of claim 9, wherein sending, via the one or more processors, the instruction to decrease the insurance premium of the driver of the vehicle occurs in real-time.

12. The method of claim 9, comprising generating, via the one or more processors, a third risk factor based at least in part on determining that the speed of the vehicle is above a speed limit associated with the geographical location when the emergency vehicle is present in the geographical location.

13. The method of claim 12, comprising sending, via the one or more processors, a second instruction to increase the insurance premium of the driver of the vehicle based at least in part on determining that the third risk factor is greater than the second risk factor.

14. The method of claim 9, comprising
receiving, via the one or more processors, a speed of the vehicle from a sensor of the vehicle or an electronic device disposed in the vehicle and a speed limit associated with the geographical location; and
determining, via the one or more processors, that the speed of the vehicle is below the speed limit associated with the geographical location when the emergency vehicle is present in the geographical location.

15. The method of claim 14, wherein generating the second risk factor is based at least in part on determining that the speed of the vehicle is below the speed limit associated with the geographical location when the emergency vehicle is present in the geographical location.

16. One or more tangible, non-transitory, machine-readable media comprising instructions configured to cause one or more processors to:

receive a geographical location of a vehicle, a speed of the vehicle, a route for the vehicle, and an indication of a presence of an emergency vehicle along the route;

receive a first risk factor from a computing device, wherein the computing device is configured to generate the first risk factor based at least in part on the speed of the vehicle and the indication of the presence of the emergency vehicle using risk analysis software;

provide an alternative route for the vehicle to avoid the emergency vehicle;

receive a second risk factor from the computing device, wherein the computing device is configured to generate the second risk factor based at least in part on receiving an indication that the vehicle followed the alternative route; and send an instruction to decrease an insurance premium of a driver of the vehicle based at least in part on determining that the second risk factor is less than the first risk factor.

17. The one or more tangible, non-transitory, machine-readable media of claim 16, wherein the instructions are configured to cause the one or more processors to receive a third risk factor from the computing device, wherein the computing device is configured to generate the third risk factor based at least in part on determining that the speed of the vehicle is above a speed limit associated with the geographical location when the emergency vehicle is present in the geographical location.

18. The one or more tangible, non-transitory, machine-readable media of claim 17, wherein the instructions are configured to cause the one or more processors to send a second instruction to increase the insurance premium of the driver of the vehicle based at least in part on determining that the third risk factor is greater than the second risk factor.

19. The one or more tangible, non-transitory, machine-readable media of claim 16, wherein the instructions are configured to cause the one or more processors to:

receive a speed of the vehicle from a sensor of the vehicle or an electronic device disposed in the vehicle and a speed limit associated with the geographical location; and determine that the speed of the vehicle is below the speed limit associated with the geographical location when the emergency vehicle is present in the geographical location.

20. The one or more tangible, non-transitory, machine-readable media of claim 19, wherein the computing device is configured to generate the second risk factor based at least in part on determining that the speed of the vehicle is below the speed limit associated with the geographical location when the emergency vehicle is present in the geographical location.

* * * * *